(12) United States Patent
Tobita et al.

(10) Patent No.: US 7,291,381 B2
(45) Date of Patent: Nov. 6, 2007

(54) THERMALLY CONDUCTIVE FORMED ARTICLE AND METHOD OF MANUFACTURING THE SAME

(75) Inventors: Masayuki Tobita, Tokyo (JP); Naoyuki Shimoyama, Tokyo (JP); Shinya Tateda, Tokyo (JP); Tsunehisa Kimura, Tokyo (JP); Masafumi Yamato, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 576 days.

(21) Appl. No.: 10/409,957

(22) Filed: Apr. 9, 2003

(65) Prior Publication Data

US 2003/0194544 A1 Oct. 16, 2003

(30) Foreign Application Priority Data

Apr. 10, 2002 (JP) ............................. 2002-108213

(51) Int. Cl.
*B32B 18/00* (2006.01)
*B05D 1/16* (2006.01)
*B29C 67/00* (2006.01)

(52) U.S. Cl. ..................... 428/299.1; 427/462; 264/437

(58) Field of Classification Search ................ 428/615, 428/634, 620, 113, 114, 172, 212, 219, 299.1; 264/437, 438; 427/462–465

See application file for complete search history.

(56) References Cited

U.S. PATENT DOCUMENTS 4,855,091 A * 8/1989 Geus et al. ................. 264/437
5,873,973 A * 2/1999 Koon et al. ............... 156/272.4
6,517,744 B1 * 2/2003 Hara et al. .................. 252/506

FOREIGN PATENT DOCUMENTS

| EP | 001352922 A2 | * 10/2003 |
|---|---|---|
| JP | 4-173235 A | 6/1992 |
| JP | 5-222620 A | 8/1993 |
| JP | 9-283955 A | 10/1997 |
| JP | 10-330502 A | 12/1998 |
| JP | 11-46021 A | 2/1999 |
| JP | 11-97593 A | 4/1999 |
| JP | 11-199949 A | 7/1999 |
| JP | 11-302545 | * 11/1999 |
| JP | 11-302545 A | 11/1999 |
| JP | 2000-195998 A | 7/2000 |
| JP | 2000-281802 | * 10/2000 |
| JP | 2000-281802 A | 10/2000 |
| JP | 2001-139833 A | 5/2001 |
| JP | 2001-335602 A | 12/2001 |
| JP | 2001-353736 | * 12/2001 |
| JP | 2001-353736 A | 12/2001 |
| JP | 2002-88171 A | 3/2002 |
| JP | 2002-88257 A | 3/2002 |

* cited by examiner

*Primary Examiner*—N. Edwards
(74) *Attorney, Agent, or Firm*—Crompton, Seager & Tufte, LLC

(57) ABSTRACT

A thermally conductive formed article according to the present invention includes a matrix, and short carbon fibers which are present in the matrix. The short carbon fibers are oriented in a fixed direction in the matrix. A ratio $I_{(002)}/I_{(110)}$ between an intensity $I_{(110)}$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along the direction of orientation of the short carbon fibers, is 10 or less.

16 Claims, 2 Drawing Sheets

THERMALLY CONDUCTIVE FORMED ARTICLE AND METHOD OF MANUFACTURING THE SAME

BACKGROUND OF THE INVENTION

The present invention relates to a thermally conductive formed article and a method of manufacturing the same.

Conventionally, as a thermally conductive formed article, Japanese Laid-open Patent Publication No. 5-222620 discloses a formed article in which pitch-based short carbon fibers having a specific cross-sectional structure are dispersed in a matrix. Japanese Laid-open Patent Publication No. 9-283955 discloses a formed article in which short graphitized carbon fibers having a specific aspect ratio are dispersed in a matrix. Japanese Laid-open Patent Publication No. 4-173235, Japanese Laid-open Patent Publication No. 10-330502, Japanese Laid-open Patent Publication No. 11-46021, Japanese Laid-open Patent Publication No. 11-302545, Japanese Laid-open Patent Publication No. 2000-195998, Japanese Laid-open Patent Publication No. 2000-281802, Japanese Laid-open Patent Publication No. 2001-139833, and Japanese Laid-open Patent Publication No. 2001-353736 disclose formed articles in which short carbon fibers are oriented in a fixed direction in a polymer matrix. Japanese Laid-open Patent Publication No. 11-97593, and Japanese Laid-open Patent Publication No. 11-199949 disclose formed articles in which short carbon fibers are oriented in a fixed direction in a metal matrix.

The above conventional thermally conductive formed articles are used, for instance, in electronic devices and apparatuses as heat-conducting members for conducting heat generated from electronic components out of the apparatus so as to prevent overheat of the electronic components. In electronic devices and apparatuses, with enhancement of performance thereof, the electronic components thereof generate an increasing amount of heat. Therefore, recently, thermally conductive formed articles used as heat-conducting members have a requirement of having high thermal conductivity. However, the conventional thermally conductive formed articles do not always have thermal conductivity high enough to meet the requirement.

BRIEF SUMMARY OF THE INVENTION

It is an object of the present invention to provide a thermally conductive formed article having high thermal conductivity and a method of manufacturing the thermally conductive formed article.

To achieve the above objective, the present invention provides a thermally conductive formed article. The formed article includes a matrix, and short carbon fibers which are present in the matrix in a state oriented in a fixed direction. A ratio $I_{(002)}/I_{(110)}$ between an intensity $I_{(110)}$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along the direction of orientation of the short carbon fibers, is 10 or less.

The wording "X-rays are irradiated along the direction of orientation of the short carbon fibers" is intended to mean that X-rays are irradiated along a direction in which the short carbon fibers are substantially oriented, that is, a direction in which most of the short carbon fibers are oriented.

The present invention also provides a thermally conductive formed article. The formed article includes a matrix, and short carbon fibers which are present in the matrix in a state oriented in a fixed direction. A ratio $I_{(002)}/I_{(100)}$ between an intensity $I_{(100)}$ of a diffraction peak ascribable to a (100) surface of carbon and an intensity $I_{(002)}$ of a diffraction peak ascribable to a (002) surface of carbon, occurring when X-rays are irradiated onto the thermally conductive formed article along the direction of orientation of the short carbon fibers, is 10 or less.

The present invention further provides a method of manufacturing a thermally conductive formed article. The method includes the steps of forming a mixture composition prepared by mixing a matrix material and short carbon fibers with each other into a predetermine form to produce a formed but uncured mixture composition; applying an electric field or a magnetic field to the formed but uncured mixture composition to thereby orient the short carbon fibers in the mixture composition in a fixed direction such that a ratio $I_{(002)}/I_{(110)}$ between an intensity $I_{(110)}$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along a direction of orientation of the short carbon fibers, is 10 or less; and curing the formed but uncured mixture composition.

The present invention still further provides a method of manufacturing a thermally conductive formed article. The method includes the steps of forming a base layer by a matrix material; implanting short carbon fibers on a surface of the base layer by an electrostatic flocking method such that a ratio $I_{(002)}/I_{(110)}$ between an intensity $I_{(110)}$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along a direction of orientation of the short carbon fibers, is 10 or less; and covering the surface of the base layer by the matrix material such that the implanted short carbon fibers are buried.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
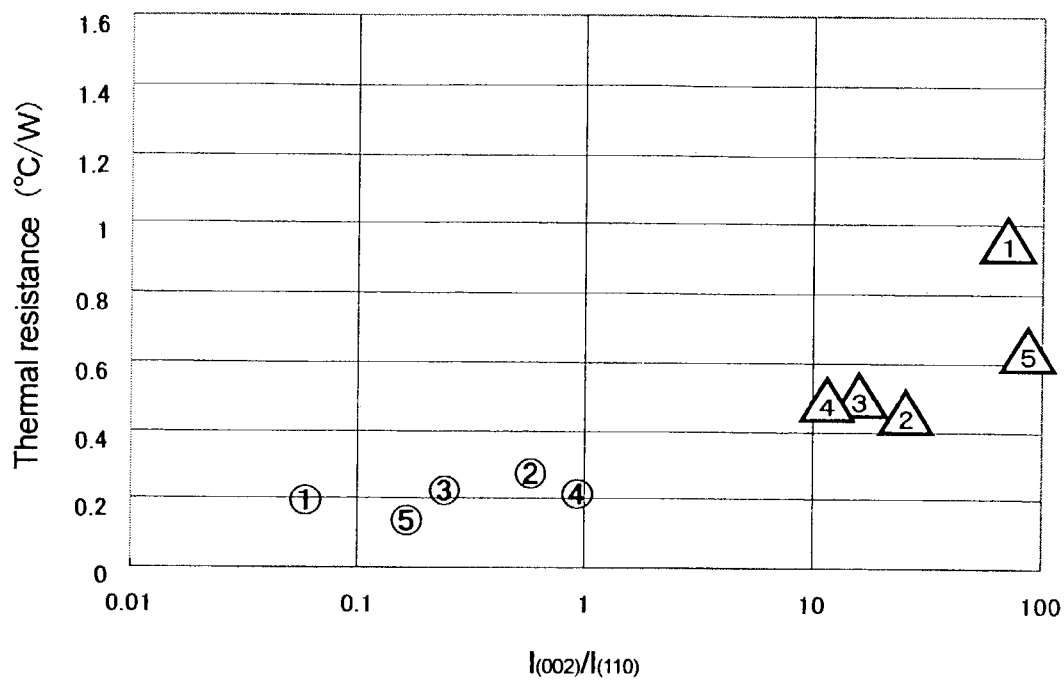
FIG. 1 shows a graph illustrating a correlation between a thermal resistance and a ratio $I_{(002)}/I_{(110)}$ found in the thermally conductive sheet of Examples 1 to 5 and Comparative Examples 1 to 5.

The present invention will now be described in detail with reference to the drawings showing a preferred embodiment thereof.

A thermally conductive sheet according to the present embodiment includes a polymer matrix, and short carbon fibers which are present in the polymer matrix in a state oriented in the direction of thickness of the thermally conductive sheet. A ratio $I_{(002)}/I_{(110)}$ between the intensity $I_{(110)}$ of a diffraction peak ascribable to a (110) surface of carbon and the intensity $I_{(002)}$ of a diffraction peak ascribable to a (002) surface of carbon is 10 or less occurring when X-rays are irradiated onto the thermally conductive sheet along the direction of orientation of the short carbon fibers, that is, the direction of the thickness of the thermally conductive sheet. The ratio $I_{(002)}/I_{(110)}$ is preferably 1 or less, and more preferably 0.2 or less. Normally, the lower limit value of the ratio $I_{(002)}/I_{(110)}$ is equal to 0.01. In the case of carbon fibers, the (110) surface is orthogonal to the (002) surface corresponding to a base surface, i.e. C surface, and in parallel with the fiber axis. Therefore, the ratio $I_{(002)}/I_{(110)}$ serves as an index indicating the degree of orientation of the short carbon fibers in the thermally conductive sheet.

Although the thermally conductive sheet is not particularly limited in hardness, it has preferably a Shore A hardness of 70 or less, and more preferably a Shore A hardness of 40 or less. Particularly preferably, it has an Asker C hardness of 30 or less.

It is preferred that the thermally conductive sheet has a thickness of 20 µm or more, and more preferably 100 µm or more. Further, it is preferred that the thermally conductive sheet has a thickness of 10 mm or less, and more preferably 5 mm or less.

It is preferred that the thermally conductive sheet has a thermal resistance value of 0.3° C./W or smaller in the direction of thickness thereof.

The kinds of matrix materials composing the above polymer matrix are not particularly limited. Preferred matrix materials include thermoplastic resins, thermoplastic elastomers, curable resins, and crosslinked rubbers. The matrix materials may include polymer alloys formed by blending two or more kinds of polymers. The polymer matrix may be formed of one kind of matrix material or two or more kinds of matrix materials.

Examples of the thermoplastic resins as the matrix materials include polyethylene, polypropylene, ethylene-a-olefin copolymers, such as ethylene-propylene copolymer, polymethylpentene, polyvinyl chloride, polyvinylidene chloride, polyvinyl acetate, ethylene-vinyl acetate copolymer, polyvinyl alcohol, polyacetal, fluororesins, such as polyvinylidene fluoride and polytetrafluoroethylene, polyethylene terephthalate, polybutylene terephthalate, polyethylene naphthalate, polystyrene, polyacrylonitrile, styrene-acrylonitrile copolymer, ABS resin, polyphenylene ether, modified polyphenylene ether, aliphatic polyamides, aromatic polyamides, polyamide imide, polymethacrylic acid, polymethacrylic ester, polyacrylic acid, polyacrylic ester, polycarbonate, polyphenylene sulfide, polysulfone, polyether sulfone, polyether nitrile, polyether ketone, polyketone, liquid crystal polymers, silicone resins, and ionomers.

Examples of the thermoplastic elastomers as the matrix materials include styrene-based thermoplastic elastomers, such as styrene-butadiene copolymer, styrene-isoprene block copolymer, and hydrogenated polymer thereof, olefin-based thermoplastic elastomers, vinyl chloride-based thermoplastic elastomers, polyester-based thermoplastic elastomers, polyurethane-based thermoplastic elastomers, and polyamide-based thermoplastic elastomers.

Examples of the curable resins as the matrix materials include epoxy resins, polyimide, bismaleimide resins, benzocyclobutene resins, phenol resins, unsaturated polyesters, diallyl phthalate resins, silicone resins, polyurethane, polyimide silicone, thermally curable polyphenylene ether, and thermally curable modified polyphenylene ether.

Examples of the crosslinked rubbers as the matrix materials include natural rubber, butadiene rubber, isoprene rubber, nitrile rubber, hydrogenated nitrile rubber, chloroprene rubber, ethylenepropylene rubber, chlorinated polyethylene, chlorosulfonated polyethylene, butyl rubber, halogenated butyl rubber, fluororubber, urethane rubber, and silicone rubber.

Of the above matrix materials, preferable matrix materials are silicone rubber, epoxy resins, polyurethane, unsaturated polyesters, polyimide, bismaleimide resins, benzocyclobutene resins, fluororesins, polyphenylene ether, and thermoplastic elastomers. More preferable matrix materials are silicone rubber, epoxy resins, polyimide, polyurethane, and thermoplastic elastomers.

The kinds of the short carbon fibers are not particularly limited. Preferable short carbon fibers are short graphitized carbon fibers. The short graphitized carbon fibers can be produced by carrying out a heat treatment on pitch-based or mesophase pitch-based carbon fibers which can be obtained, e.g. by a melt spinning process, an infusibilizing process, and a graphitizing process, at 2000° C. or higher. The short graphitized carbon fibers can also be produced by carrying out a heat treatment on hard organic polymer fibers, such as polyimide fibers, aromatic polyamide fibers, and polybenzoxazole fibers, at 2000° C. or more. Further, the short graphitized carbon fibers can also be produced by a vapor phase growth method.

Preferably, the short carbon fibers have an average diameter of 5 µm or more. Preferably, the short carbon fibers have average diameter of 20 µm or less.

Preferably, the short carbon fibers has an average length of 5 µm or more. Preferably, the short carbon fibers has an average length of 800 µm or less.

Preferably, the short carbon fibers have a thermal conductivity of 200 W/m·K or more, more preferably 400 W/m·K or more, and particularly preferably 1000 W/m·K or more, along the fiber axis.

Preferably, the content of the short carbon fibers in the thermally conductive sheet is 5 parts by weight or more relative to 100 parts by weight of the matrix material. Preferably, the content of the short carbon fibers in the thermally conductive sheet is 400 parts by weight or less relative to 100 parts by weight of the matrix material, and more preferably 200 parts by weight or less.

Next, a first method of producing the thermally conductive sheet according to the present embodiment will be described. In this method, first, the short carbon fibers and the matrix material are mixed with each other to prepare a mixture composition. Subsequently, the mixture composition is formed into a sheet. The formed mixture composition is cured in a state in which the short carbon fibers in the composition are oriented along the direction of thickness of the composition.

A mixing device, such as a blender, a mixer, a roll, or an extruder, may be used when the short carbon fibers and the matrix material are mixed with each other.

The forming of the mixture composition into a sheet is effected by a variety of methods, such as a bar coater method, a doctor blade method, an extrusion method using a T-die, a calendering method, a pressing method, an injection molding method, a cast molding method, a transfer molding method, or a blow molding method. If the mixture composition is in a liquid form, it may be formed into a sheet by a coating method, a printing method, a dispenser method, or a potting method.

The short carbon fibers in the formed mixture composition are oriented, for example, by a method using a flow field or a shear field, or by a method utilizing a magnetic field or an electric field. Preferably, the short carbon fibers are oriented by the method utilizing a magnetic field or an electric field. When the method utilizing a magnetic field or an electric field is employed, the magnetic field or the electric field is applied to the formed but uncured mixture composition, whereby the short carbon fibers in the composition are oriented in parallel with lines of magnetic force or electric force.

If the matrix material is a curable resin or a crosslinked rubber, the formed mixture composition may be cured by a thermal curing method, or by other methods than the thermal curing method, such as a light curing method and a moisture curing method.

Next, a second method of producing the thermally conductive sheet according to the present embodiment will be described. In this method, first, a base layer is formed by the matrix material. Then, the short carbon fibers are implanted on a surface of the base layer by an electrostatic flocking method. After that, the surface of the base layer is covered by the matrix material such that the implanted short carbon fibers are buried.

The present embodiment has the following advantageous effects:

For the ratio $I_{(002)}/I_{(110)}$ to have a value equal to or smaller than 10 indicates that the short carbon fibers in the thermally conductive sheet are highly oriented along the direction of the thickness of the sheet. The short carbon fibers have high thermal conductivity along the fiber axis. Therefore, the thermally conductive sheet in which the short carbon fibers are highly oriented along the direction of the thickness of the sheet has high thermal conductivity along the direction of the thickness thereof. More specifically, if the ratio $I_{(002)}/I_{(110)}$ is 10 or less, the thermally conductive sheet has high thermal conductivity along the direction of the thickness thereof. If the ratio $I_{(002)}/I_{(110)}$ is 1 or less, the degree of orientation of the short carbon fibers is increased, so that the thermal conductivity of the thermally conductive sheet is further enhanced along the direction of the thickness of the sheet. If the ratio $I_{(002)}/I_{(110)}$ is 0.2 or less, the thermal conductivity of the thermally conductive sheet is still further enhanced along the direction of the thickness of the sheet.

If the hardness of the thermally conductive sheet is equal to or smaller than a Shore A hardness of 70, it is possible to obtain a thermally conductive sheet excellent in stress relaxation property and followability. If the hardness is equal to or smaller than the Shore A hardness of 40, the thermally conductive sheet is improved in stress relaxation property and followability. If the hardness is equal to or smaller than an Asker C hardness of 30, the thermally conductive sheet is further improved in stress relaxation property and followability.

If the thermally conductive sheet has a thickness of 20 μm or more, it is possible to prevent the thermally conductive sheet from becoming difficult to produce and handle due to too small thickness of the sheet. If the thermally conductive sheet has a thickness of 100 μm or more, the ease of production and handling of the sheet is increased.

If the thermally conductive sheet has a thickness of 10 mm or less, it is possible to prevent the sheet from becoming lower in thermal conductivity due to too large thickness of the same.

If the value of thermal resistance of the thermally conductive sheet in the direction of the thickness thereof is 0.3° C./W or less, the thermally conductive sheet is increased in thermal conductivity in the direction of the thickness thereof.

The short graphitized carbon fibers have high thermal conductivity. Therefore, if the short carbon fibers contained in the thermally conductive sheet are short graphitized carbon fibers, the thermally conductive sheet is increased in thermal conductivity.

If the average diameter of the short carbon fibers is 5 μm or more, it becomes easy to orient the short carbon fibers in the mixture composition in a predetermined desired direction.

Short carbon fibers having an average diameter of 20 μm or less can be produced at lower manufacturing costs than short carbon fibers having an average diameter larger than 20 μm. Therefore, if the average diameter of the short carbon fibers is 20 μm or less, the manufacturing costs of the thermally conductive sheet are reduced.

Short carbon fibers having an average length of 5 μm or more can be produced at lower manufacturing costs, and at the same time handled more easily than short carbon fibers having an average length smaller than 5 μm. Therefore, if the average length of the short carbon fibers is 5 μm or more, it is possible to reduce the manufacturing costs of the thermally conductive sheet as well as facilitate production of the thermally conductive sheet.

If the average length of the short carbon fibers is 800 μm or less, it becomes easy to orient the short carbon fibers in the mixture composition in a predetermined desired direction.

If the short carbon fibers have a thermal conductivity of 200 W/m·K or more along the fiber axis, it is possible to obtain a thermally conductive sheet having high thermal conductivity. If the thermal conductivity of the short carbon fibers is 400 W/m·K or more, the thermal conductivity of the thermally conductive sheet is further enhanced. If the thermal conductivity of the short carbon fibers is 1000 W/m·K or more, the thermal conductivity of the thermally conductive sheet is still further enhanced.

If the content of the short carbon fibers in the thermally conductive sheet is 5 parts by weight or more relative to 100 parts by weight of the matrix material, it is possible to prevent the thermally conductive sheet from becoming lower in thermal conductivity due to too small content of the fibers.

If the content of the short carbon fibers in the thermally conductive sheet is 400 parts by weight or less relative to 100 parts by weight of the matrix material, it is possible to prevent the mixture composition from becoming too viscous. This enables the short carbon fibers in the mixture composition to be oriented in a desired direction relatively easily. If the content of the short carbon fibers in the thermally conductive sheet is 200 parts by weight or less relative to 100 parts by weight of the matrix material, it is possible to more positively prevent the mixture composition from becoming too viscous.

If the matrix material is any of thermoplastic resins, thermoplastic elastomers, curable resins, and crosslinked rubber, the mixture composition is excellent in formability.

If the matrix material is any of silicone rubber, epoxy resins, polyurethane, unsaturated polyesters, polyimide, bismaleimide resins, benzocyclobutene resins, fluororesins, polyphenylene ether, and thermoplastic elastomers, it is possible to obtain a thermally conductive sheet excellent in thermal resistance and electric reliability. Further, if the matrix material is any of silicone rubber, epoxy resins, polyimide, polyurethane, and thermoplastic elastomers, the thermally conductive sheet is enhanced in thermal resistance and electric reliability.

The method utilizing a magnetic field or an electric field is capable of positively and easily orienting the short carbon fibers in the mixture composition in the predetermined direction. The short carbon fibers can be positively and easily oriented in the predetermined direction by the electrostatic flocking method as well.

The above embodiment may be modified as follows:

Although in the above embodiment, the present invention is embodied in the thermally conductive sheet, that is, in a thermally conductive formed article in the form of a sheet, this is not limitative, but it may be embodied in a thermally conductive formed article in a form other than the form of a sheet. In short, the form of the thermally conductive formed article according to the present invention is not limited to the form of a sheet.

The present invention may be embodied in a radiator plate, a wiring board, a semiconductor package material, a heat sink, a heat spreader, or a housing. In other words, the thermally conductive formed article according to the present invention may be a radiator plate, a wiring board, a semiconductor package material, a heat sink, a heat spreader, or a housing. When the present invention is embodied in a wiring board, it is preferred that the matrix material is any of fluororesins, thermally curable polyphenylene ether, thermally curable modified polyphenylene ether, olefin-based resins, benzocyclobutene resins, polyimide, fluorinated polyimide, polybenzoxazole, and fluorinated polybenzoxazole. This is because the wiring board is required to be small in dielectric constant and dielectric loss tangent, and excellent in high-frequency characteristics.

The direction of orientation of the short carbon fibers is not necessarily required to coincide with the direction of the thickness of the thermally conductive sheet. It may be changed as required.

As the index indicating the degree of orientation of the short carbon fibers in the thermally conductive sheet, not the ratio $I_{(002)}/I_{(110)}$ but a ratio $I_{(002)}/I_{(100)}$ may be used. The ratio $I_{(002)}/I_{(100)}$ is obtained based on an intensity $I_{(100)}$ of a diffraction peak ascribable to a (100) surface of carbon and an intensity $I_{(002)}$ of a diffraction peak ascribable to a (002) surface of carbon, occurring when X-rays are irradiated onto the thermally conductive sheet along the direction of orientation of the short carbon fibers. The ratio $I_{(002)}/I_{(100)}$ is 10 or less, preferably 1 or less, and more preferably 0.2 or less. Normally, the lower limit value of the ratio $I_{(002)}/I_{(100)}$ is 0.01. Similarly to the (110) surface, the (100) surface is orthogonal to the (002) surface, and in parallel with the fiber axis. Therefore, the ratio $I_{(002)}/I_{(100)}$ as well serves as an index indicating the degree of orientation of the short carbon fibers in the thermally conductive sheet.

The polymer matrix may be replaced by a metal matrix, a ceramic matrix, or a carbon matrix. Examples of a matrix material forming the metal matrix include aluminum, copper, and alloys containing them. Further, specific examples of a matrix material forming the ceramic matrix include aluminum oxide, aluminum nitride, silicon carbide, silicon nitride, boron nitride, and precursors thereof. Specific examples of a matrix material forming the carbon matrix include carbon and graphite.

The surfaces of the short carbon fibers may be modified in advance. The modification of the surfaces of the short carbon fibers is effected, for example, by carrying out oxidation processing, such as electrolytic oxidation, on the surfaces, or by performing processing using a coupling agent or a sizing agent thereon. By modifying the surfaces of the short carbon fibers, wettability and peel strength between the matrix material and the short carbon fibers as well as a filling property of the short carbon fibers are enhanced.

Part or a whole of the surface of each short carbon fiber may be coated with a metal, a ceramic, or an organic polymer in advance. In other words, a metal, a ceramic, or an organic polymer may be attached in advance to part or a whole of the surface of the short carbon fiber. The coating of the short carbon fibers is effected, for example, by electroless plating, electrolytic plating, physical vapor deposition, such as vacuum deposition, sputtering, and ion plating, chemical vapor deposition, a coating method, an immersion method, or a mechanochemical method. In the mechanochemical method, minute particles are mechanically fixedly attached to the surfaces of the short carbon fibers. Short carbon fibers coated with a ferromagnetic material, such as nickel or ferrite, are excellently oriented by the magnetic field. Short carbon fibers coated with an electrical insulating material, such as aluminum oxide, magnesium oxide, boron nitride, aluminum nitride, silicon nitride, silicon carbide, aluminum hydroxide, or an organic polymer, are excellently oriented by the electric field, and can be suitably employed in the electrostatic flocking method.

The thermally conductive sheet according to the above embodiment may contain two or more kinds of short carbon fibers. For instance, the thermally conductive sheet may contain short graphitized carbon fibers and short non-graphitized carbon fibers. Further, the thermally conductive sheet may contain two or more kinds of short graphitized carbon fibers, or two or more kinds of short non-graphitized carbon fibers.

The thermally conductive sheet according to the above embodiment may contain a metal, a ceramic, or a carbon in a form other than the form of short carbon fibers, as components other than the short carbon fibers and the matrix material. Examples of the metal include silver, copper, and gold. Examples of the ceramic include aluminum oxide, magnesium oxide, boron nitride, aluminum nitride, silicon nitride, silicon carbide, and aluminum hydroxide. Examples of the form of carbon than the short carbon fibers include forms of non-fibers, such as balls, beads, whiskers, scales, flat plates, coils, monolayer tubes, and multilayer tubes, and a form of mesocarbon microbeads. The above non-fiber forms of carbon may be either of graphitized carbon and non-graphitized carbon. Specific examples of the form of carbon other than the short carbon fibers further include graphitized carbon in the form of non-fibers, produced by carrying out a heat treatment on organic polymers, such as polyimide, polyamide, and polybenzoxazole, at 2400° C. or more. Monolayer carbonnanotubes have high thermal conductivity, so that if the monolayer carbonnanotubes are added, the thermally conductive sheet is improved in thermal conductivity. Especially, if the monolayer carbonnanotubes are oriented similarly to the short carbon fibers, the thermal conductivity of the thermally conductive sheet is further enhanced. If the ceramic is added, the thermally conductive sheet is improved in electrical insulating property. Therefore, the thermally conductive sheet having the ceramic added thereto can be suitably employed for uses demanding electrical insulating property.

The thermally conductive sheet according to the above embodiment may contain a thermally conductive filler, such as a resin coated with metal, a volatile organic solvent, and a reactive plasticizer, as components other than the short carbon fibers and the matrix material. When the organic solvent and the plasticizer are added, the viscosity of the mixture composition is lowered.

EXAMPLES

Next, the present invention will be described in more detail with reference to Examples and Comparative Examples.

Example 1

100 parts by weight of an addition-type liquid silicone rubber (TSE 3070 produced by GE Toshiba Silicones), and 110 parts by weight of pitch-based short carbon fibers (Melblon Milled Fiber produced by Petoca Materials Limited) were mixed to prepare a mixture composition A. The pitch-based short carbon fibers have an average length of 100 µm, an average diameter of 9 µm, and a thermal conductivity of 1000 W/m·K along the fiber axis. The prepared mixture composition A was formed into a sheet after carrying out pressure reduction and deaeration. Then, a magnetic field having a magnetic flux density of 10 teslas was applied to the formed mixture composition A by using a superconducting magnet, whereby the short carbon fibers in the mixture composition A were sufficiently oriented along the direction of thickness of the mixture composition A. After that, the formed mixture composition A was heated to be cured, whereby a thermally conductive sheet which was 20 mm long by 20 mm wide by 1 mm thick was obtained.

Example 2

The above mixture composition A was formed into a sheet after carrying out pressure reduction and deaeration. Then, a magnetic field having a magnetic flux density of 6 teslas was applied to the formed mixture composition A by using the superconducting magnet, whereby the short carbon fibers in the mixture composition A were sufficiently oriented along the direction of thickness of the mixture composition A. After that, the formed mixture composition A was heated to be cured, whereby a thermally conductive sheet which was 20 mm long by 20 mm wide by 1 mm thick was obtained.

Comparative Example 1

The above mixture composition A was formed into a sheet after carrying out pressure reduction and deaeration. Next, the formed mixture composition A was heated to be cured, whereby a thermally conductive sheet which was 20 mm long by 20 mm wide by 1 mm thick was obtained.

Comparative Example 2

The above mixture composition A was formed into a sheet after carrying out pressure reduction and deaeration. Then, a magnetic field having a magnetic flux density of 2 teslas was applied to the formed mixture composition A by using the superconducting magnet, whereby some of the short carbon fibers in the mixture composition A were oriented along the direction of thickness of the mixture composition A. After that, the formed mixture composition A was heated to be cured, whereby a thermally conductive sheet which was 20 mm long by 20 mm wide by 1 mm thick was obtained.

Example 3

100 parts by weight of a liquid epoxy resin (produced by Three Bond Company, Ltd), 40 parts by weight of pitch-based short carbon fibers (K1100X produced by Amoco Fabric and Fibers Company), and 10 parts by weight of a boron nitride powder (UHP-EX produced by Showa Denko KK) were mixed to prepare a mixture composition B. The pitch-based short carbon fibers have an average length of 100 µm, an average diameter of 10 µm, and a thermal conductivity of 1050 W/m·K along the fiber axis. The prepared mixture composition B was formed into a sheet after carrying out pressure reduction and deaeration. Then, a magnetic field having a magnetic flux density of 10 teslas was applied to the formed mixture composition B by using the superconducting magnet, whereby the short carbon fibers in the mixture composition B were sufficiently oriented along the direction of thickness of the mixture composition B. After that, the formed mixture composition B was heated to be cured, whereby a thermally conductive sheet which was 20 mm long by 20 mm wide by 1 mm thick was obtained.

Comparative Example 3

The above mixture composition B was formed into a sheet after carrying out pressure reduction and deaeration. Then, a magnetic field having a magnetic flux density of 1 tesla was applied to the formed mixture composition B by using the superconducting magnet, whereby some of the short carbon fibers in the mixture composition B were oriented along the direction of thickness of the mixture composition B. After that, the formed mixture composition B was heated to be cured, whereby a thermally conductive sheet which was 20 mm long by 20 mm wide by 1 mm thick was obtained.

Example 4

100 parts by weight (in terms of solid content) of a polyimide varnish (UPIFINE ST produced by UBE INDUSTRIES, LTD., solid content density of 18.5%) containing N-methyl pyrrolidone, 40 parts by weight of short carbon fibers (produced by Nippon Graphite Fiber), and 40 parts by weight of a spherical aluminum oxide powder (A20 produced by Showa Denko KK, average particle diameter of 30 µm) were mixed to prepare a mixture composition C. The short carbon fibers have a surface coated with ferromagnetic nickel by electroless plating, and have an average length of 25 µm, an average diameter of 10 µm, and a thermal conductivity of 1000 W/m·K along the fiber axis. The prepared mixture composition C was formed into a block which was 20 mm long by 20 mm wide by 40 mm thick. Then, a magnetic field having a magnetic flux density of 0.5 teslas was applied to the formed mixture composition C by using a permanent magnet, whereby the short carbon fibers in the mixture composition C were sufficiently oriented along the direction of thickness of the mixture composition C. Then, the N-methyl pyrrolidone was removed, and further the formed mixture composition C was heated to be cured, whereby a thermally conductive formed article in the form of a block was obtained. After that, the thermally conductive formed article was sliced to obtain a thermally conductive sheet which was 20 mm long by 20 mm wide by 200 µm thick and in which the short carbon fibers were oriented along the direction of thickness thereof.

Comparative Example 4

The above mixture composition C was formed into a block which was 20 mm long×20 mm wide×40 mm thick. Then, a magnetic field having a magnetic flux density of 0.1 tesla was applied to the formed mixture composition C by using a permanent magnet, whereby some of the short carbon fibers in the mixture composition C were oriented along the direction of thickness of the mixture composition C. Then, the N-methyl pyrrolidone was removed, and further the formed mixture composition C was heated to be cured, whereby a thermally conductive formed article in the form of a block was obtained. Subsequently, the thermally conductive formed article was sliced to obtain a thermally conductive sheet which was 20 mm long by 20 mm wide by 200 μm thick and in which some of the short carbon fibers were oriented along the direction of thickness thereof.

Example 5

An addition-type liquid silicone rubber (TSE 3070 produced by GE Toshiba Silicones) was printed on a mold releasing film by screen printing to form a base layer having a thickness of 60 μm. Then, pitch-based short carbon fibers (K1100X produced by Amoco Fabric and Fibers Company) were implanted on a surface of the base layer by the electrostatic flocking method. Subsequently, the surface of the base layer was covered with the addition-type liquid silicone rubber (the same as the above) such that the implanted short carbon fibers were buried. Then, the liquid silicone rubber was heated to be cured, whereby a thermally conductive sheet having a thickness of 500 μm was obtained. The pitch-based short carbon fibers have an average fiber length of 150 μm, an average diameter of 10 μm, and a thermal conductivity of 1050 W/m·K along the fiber axis. The content of the short carbon fibers in the thermally conductive sheet is 8 parts by weight relative to 100 parts by weight of the silicone rubber.

Comparative Example 5

An addition-type liquid silicone rubber (TSE 3070 produced by GE Toshiba Silicones) was printed on a mold releasing film by screen printing to form a base layer having a thickness of 60 μm. Then, a mixture of 100 parts by weight of the addition-type liquid silicone rubber (the same as the above), and 8 parts by weight of a PAN-based short carbon fibers (K1352U produced by Mitsubishi Chemical Co.) was laminated on the base layer. After that, the laminated material was heated to be cured, whereby a thermally conductive sheet having a thickness of 500 μm was obtained. The short carbon fibers have an average fiber length of 150 μm, an average diameter of 10 μm, and a thermal conductivity of 140 W/m·K along the fiber axis.

Figure 2:
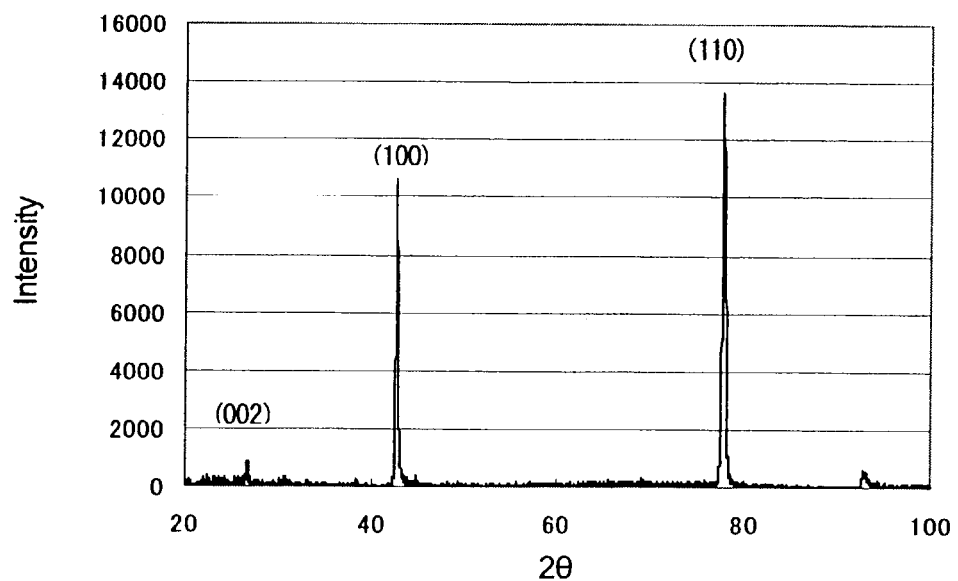
FIG. 2 is a diagram showing an X-ray diffraction pattern of Example 1 of the thermally conductive sheet.
Figure 3:
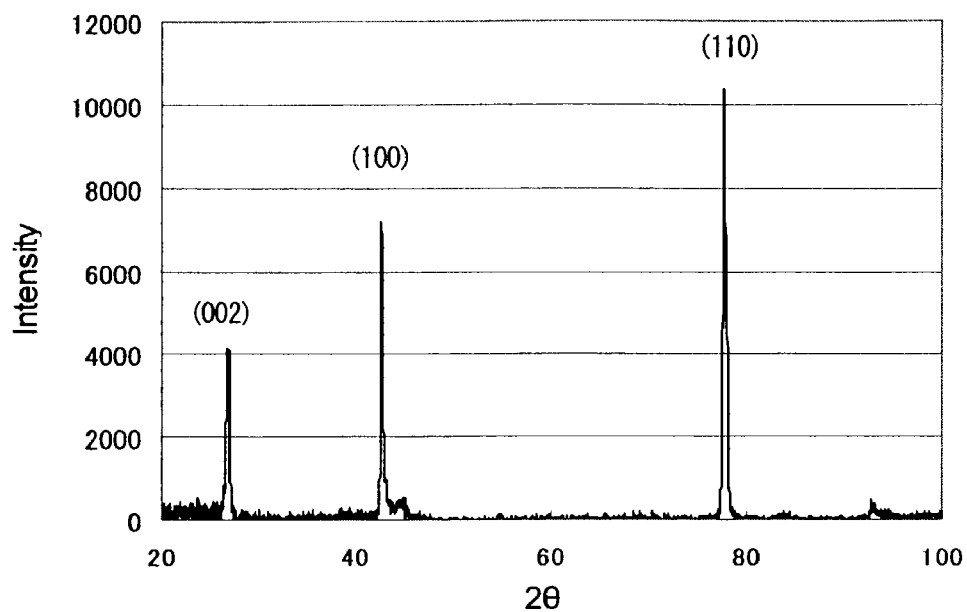
FIG. 3 is a diagram showing an X-ray diffraction pattern of Example 2 of the thermally conductive sheet.
Figure 4:
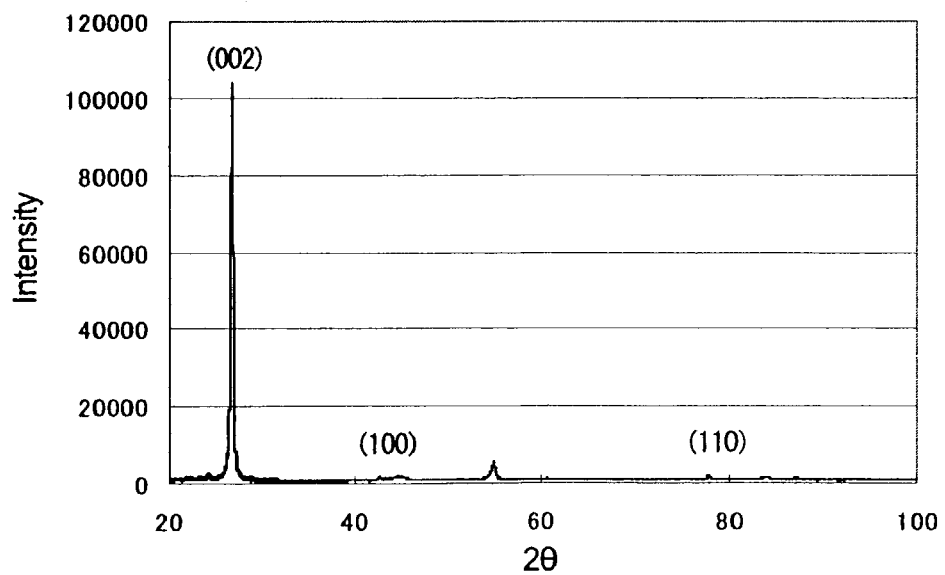
FIG. 4 is a diagram showing an X-ray diffraction pattern of Comparative Example 1 of the thermally conductive sheet.

As to each of the thermally conductive sheets obtained in Examples 1 to 5 and Comparative Examples 1 to 5 as described above, the thermal resistance in the direction of thickness of the sheet, and the ratios $I_{(002)}/I_{(110)}$, $I_{(002)}/I_{(100)}$ were determined. The results of the determination are shown in TABLE 1 below. FIG. 1 shows a correlation between the thermal resistance and the ratio $I_{(002)}/I_{(110)}$ found in the thermally conductive sheet of Examples 1 to 5 and Comparative Examples 1 to 5. In FIG. 1, numerals each in a circle represent the respective numbers of Examples, and numerals each in a triangle represent the respective numbers of Comparative Example. FIGS. 2 to 4 each show an X-ray diffraction pattern which was obtained by irradiating X-rays along the direction of thickness of the thermally conductive sheet obtained in Examples 1 and 2 and Comparative Example 3.

The thermal resistance was calculated based on the temperature of a TO-3 transistor and the temperature of a copper plate, which were measured when a thermally conductive sheet held between the transistor and the copper plate was heated by the transistor at 30 W. The calculation was performed by using the following equation:

Thermal resistance (° C./W)=[transistor temperature (° C.)–copper plate temperature (° C.)]/electric power (W)

The ratios $I_{(002)}/I_{(110)}$, and the ratios $I_{(002)}/I_{(100)}$ were calculated based on the intensity $I_{(110)}$ of a diffraction peak ascribable to the (110) surface of carbon, the intensity $I_{(100)}$ of a diffraction peak ascribable to the (100) surface of carbon, and the intensity $I_{(002)}$ of a diffraction peak ascribable to the (002) surface of carbon, occurring when X-rays were irradiated onto each thermally conductive sheet along the direction of the thickness of the thermally conductive sheet. To irradiate X-rays, an X-ray diffraction apparatus (MXP-18 produced by Mac Science Co. Ltd.) was employed, and as an X-ray source, a CuK α-ray was used which was generated at a voltage of 30 kV and a current of 15 mA. The measurement was carried out within a range of 0 to 90° (=2θ). In the X-ray diffraction patterns, the (002) surface appears at 2θ=approximately 26° (=2θ), the (100) surface appears at approximately 42° (=2θ), and the (110) surface appears at approximately 77° (=2θ).

TABLE 1

| | | Compounding Ingredient | | | | | |
|---|---|---|---|---|---|---|---|
| | Matrix | Short Carbon Fiber | Others | Flux Density (tesla) | Thermal Resistance (° C./W) | $I_{(002)}/I_{(110)}$ | $I_{(002)}/I_{(100)}$ |
| Example 1 | Silicone rubber 100 parts by weight | 110 parts by weight | — | 10 | 0.20 | 0.07 | 0.09 |
| Example 2 | Silicone rubber 100 parts by weight | 110 parts by weight | — | 6 | 0.28 | 0.40 | 0.58 |
| Comparative Example 1 | Silicone rubber 100 parts | 110 parts by weight | — | — | 0.95 | 67.0 | 101.6 |

TABLE 1-continued

| | Compounding Ingredient | | | Flux Density (tesla) | Thermal Resistance (° C./W) | $I_{(002)}/I_{(110)}$ | $I_{(002)}/I_{(100)}$ |
|---|---|---|---|---|---|---|---|
| | Matrix | Short Carbon Fiber | Others | | | | |
| Comparative Example 2 | Silicone rubber 100 parts by weight | 110 parts by weight | — | 2 | 0.45 | 17.0 | 38.5 |
| Example 3 | Epoxy resin 100 parts by weight | 40 parts by weight | Boron nitride 10 parts by weight | 10 | 0.22 | 0.18 | 0.21 |
| Comparative Example 3 | Epoxy resin 100 parts by weight | 40 parts by weight | Boron nitride 10 parts by weight | 1 | 0.52 | 12.5 | 22.8 |
| Example 4 | Polyimide varnish 100 parts by weight | 40 parts by weight | Spherical aluminum 40 parts by weight | 0.5 | 0.22 | 0.95 | 2.18 |
| Comparative Example 4 | Polyimide varnish 100 parts by weight | 40 parts by weight | Spherical aluminum 40 parts by weight | 0.1 | 1.02 | 47.5 | 98.3 |
| Example 5 | Silicone rubber 100 parts by weight | 8 parts by weight | — | — | 0.15 | 0.12 | 0.19 |
| Comparative Example 5 | Silicone rubber 100 parts by weight | 8 parts by weight | — | — | 0.62 | 90.7 | 205.5 |

As shown in TABLE 1 and FIG. 1, when compared with Comparative Examples 1 to 5 in each of which the ratio $I_{(002)}/I_{(110)}$ exceeds 10, in Examples 1 to 5 in each of which the ratio $I_{(002)}/I_{(110)}$ is equal to or smaller than 10, the thermal resistance was reduced. This shows that Examples 1 to 5 of the thermally conductive sheet are more excellent in thermal conductivity than Comparative Examples 1 to 5 of the thermally conductive sheet.

Further, when attention is paid to the ratio $I_{(002)}/I_{(100)}$ between the intensities $I_{(002)}$ and $I_{(100)}$ of the diffraction peaks, the ratio in each of Comparative Examples 1 to 5 exceeds 10, whereas the ratio in each of Examples 1 to 5 is equal to or smaller than 10. This shows that the thermal conductivity of the thermally conductive sheet can be enhanced also by defining the ratio $I_{(002)}/I_{(100)}$ in place of the ratio $I_{(002)}/I_{(110)}$.

Therefore, the present examples and embodiments are to be considered as illustrative and not restrictive and the invention is not to be limited to the details given herein, but may be modified within the scope and equivalence of the appended claims.

The invention claimed is:

1. A thermally conductive formed article comprising:
    a matrix; and
    short carbon fibers which are present in said matrix, and wherein a ratio $I_{(002)}/I_{(110)}$ between an intensity $I_{(110)}$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along a predetermined direction, is 10 or less.

2. The thermally conductive formed article according to claim 1, wherein the ratio $I_{(002)}/I_{(110)}$ is 1 or less.

3. The thermally conductive formed article according to claim 1, wherein said short carbon fibers have a thermal conductivity of 200 W/m·K or more along a fiber axis.

4. The thermally conductive formed article according to claim 1, wherein said matrix is selected from the group consisting of a polymer matrix, a metal matrix, a ceramic matrix, and a carbon matrix.

5. The thermally conductive formed article according to claim 4, wherein a matrix material forming said polymer matrix is selected from the group consisting of thermoplastic resins, thermoplastic elastomers, curable resins, and crosslinked rubbers.

6. The thermally conductive formed article according to claim 1, wherein a content of said short carbon fibers in the thermally conductive formed article is 5 to 400 parts by weight relative to 100 parts by weight of said matrix material forming said matrix.

7. The thermally conductive formed article according to claim 1, wherein the thermally conductive formed article has a thermal resistance value of 0.3° C./W or less in the predetermined direction.

8. A thermally conductive formed article comprising:
    a matrix; and
    short carbon fibers which are present in said matrix, and wherein a ratio $I_{(002)}/I_{(100)}$ between an intensity $I_{(100)}$ of a diffraction peak ascribable to a (100) surface of carbon and an intensity $I_{(002)}$ of a diffraction peak ascribable to a (002) surface of carbon, occurring when X-rays are irradiated onto the thermally conductive formed article along a predetermined direction, is 10 or less.

9. The thermally conductive formed article according to claim 8, wherein the ratio $I_{(002)}/I_{(100)}$ is 1 or less.

10. The thermally conductive formed article according to claim 8, wherein said short carbon fibers have a thermal conductivity of 200 W/m·K or more along a fiber axis.

11. The thermally conductive formed article according to claim 8, wherein said matrix is selected from the group consisting of a polymer matrix, a metal matrix, a ceramic matrix, and a carbon matrix.

12. The thermally conductive formed article according to claim 11, wherein a matrix material forming said polymer matrix is selected from the group consisting of thermoplastic resins, thermoplastic elastomers, curable resins, and crosslinked rubbers.

13. The thermally conductive formed article according to claim 8, wherein a content of said short carbon fibers in the thermally conductive formed article is 5 to 400 parts by weight relative to 100 parts by weight of said matrix material forming said matrix.

14. The thermally conductive formed article according to claim 8, wherein the thermally conductive formed article has a thermal resistance value of 0.3° C./W or less in the predetermined direction.

15. A method of manufacturing a thermally conductive formed article, comprising the steps of:
   forming a mixture composition prepared by mixing a matrix material and short carbon fibers with each other into a predetermined form to produce a formed but uncured mixture composition;
   applying an electric field or a magnetic field to the formed but uncured mixture composition to thereby orient the short carbon fibers in the mixture composition such that a ratio $I_{(002)}/I_{(110)}$ between an intensity $I_{(110)}$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along a predetermined direction, is 10 or less; and
   curing the formed but uncured mixture composition.

16. A method of manufacturing a thermally conductive formed article, comprising the steps of:
   forming a base layer by a matrix material;
   implanting short carbon fibers on a surface of the base layer by an electrostatic flocking method such that a ratio $I_{(002)}/I_{(110)}$ between an intensity $I(110)$ of a diffraction peak ascribable to a (110) surface of carbon and an intensity $I_{(002)}$ of a diffraction peak ascribable to a (002) surface of carbon, occurring when X-rays are irradiated onto the thermally conductive formed article along a predetermined direction, is 10 or less; and
   covering the surface of the base layer by the matrix material such that the implanted short carbon fibers are buried.

* * * * *

UNITED STATES PATENT AND TRADEMARK OFFICE
CERTIFICATE OF CORRECTION

PATENT NO. : 7,291,381 B2 Page 1 of 1
APPLICATION NO. : 10/409957
DATED : November 6, 2007
INVENTOR(S) : Masayuki Tobita et al.

It is certified that error appears in the above-identified patent and that said Letters Patent is hereby corrected as shown below:

Column 3
Line 31, delete "0.3° C./W" and insert therefor -- 0.3°C/W --.
Line 42, delete "ethylene-a-olefin" and insert therefor -- ethylene-α-olefin --.

Column 6
Line 3, delete "0.3° C./W" and insert therefor -- 0.3°C/W --.

Column 8
Line 52, delete "2400° C." and insert therefor -- 2400°C --.

Column 12
Line 30, delete "(° C./W)" and insert therefor -- (° C/W) --.
Line 31, delete "(° C.)-copper plate temperature (° C.)]/electric" and insert therefor
-- (° C) - copper plate temperature (° C)]/electric --.
Line 56, delete "(° C./W)" and insert therefor -- (° C/W) --.

Column 13
Line 7, delete "(° C./W)" and insert therefor -- (° C/W) --.

Column 14
Line 54, delete "0.3° C./W" and insert therefor -- 0.3°C/W --.

Column 15
Line 20, delete "0.3° C./W" and insert therefor -- 0.3°C/W --.

Signed and Sealed this

First Day of April, 2008

JON W. DUDAS
*Director of the United States Patent and Trademark Office*